Feb. 21, 1950 A. E. HARRISON 2,498,078

COMMON CONTROL FOR ELECTRICAL TUNERS AND COUPLERS

Filed March 30, 1945 2 Sheets-Sheet 1

INVENTOR
A. E. HARRISON
BY George C. Tork
ATTORNEY

Feb. 21, 1950 A. E. HARRISON 2,498,078

COMMON CONTROL FOR ELECTRICAL TUNERS AND COUPLERS

Filed March 30, 1945 2 Sheets-Sheet 2

INVENTOR
A. E. HARRISON
BY George C. Ford
ATTORNEY

Patented Feb. 21, 1950

2,498,078

UNITED STATES PATENT OFFICE 2,498,078

COMMON CONTROL FOR ELECTRICAL TUNERS AND COUPLERS

Arthur E. Harrison, Short Hills, N. J., assignor to Bell Telephone Laboratories, Incorporated, New York, N. Y., a corporation of New York Application March 30, 1945, Serial No. 585,627

3 Claims. (Cl. 250—40)

This invention relates to control systems and particularly to tuning controls for radio apparatus and has for an object to improve such controls.

In the use of radio transmitters and receivers it is often desirable to provide controls for readily shifting the frequency between several preset values either directly at the apparatus or from a remote point. In the case of receivers this can usually be done by ganging all of the tuning devices and operating them by a single control element. However, in the case of transmitters it is generally difficult if not impossible to gang all the tuning units, accordingly several controls are required. In the case of radio equipment for vehicles and particularly for aircraft, space and weight limitations are quite critical and it is necessary to keep the number of individual control units to a minimum.

One control that is necessary to the efficient operation of a radio transmitter is the matching of the impedance of the output circuit to that of the transmission line leading to the antenna. This adjustment requires a control of both the resistive and reactive components of the impedance. In the case of equipment for general use such as a transmitter for use in various types of airplanes with the resultant wide variations in antennas and lengths of transmission line, the impedance conditions encountered are so varied that there cannot be maintained such a fixed relation of resistance to reactance as would permit a single ganged control. This problem is accentuated in equipment operating over wide frequency bands. On the other hand space and weight requirements may be such as to prevent the use of separate control units.

In accordance with a feature of this invention the controls for the resistance and reactance components of an impedance matching system are so geared together that one control goes through its range of variation several times while the other goes through its range only once. As a result the combined control can be driven by a single unit and any of several values of the first component can be obtained for each value of the second.

The invention may be better understood by reference to the following detailed description in connection with the drawing in which.

Figure 1:
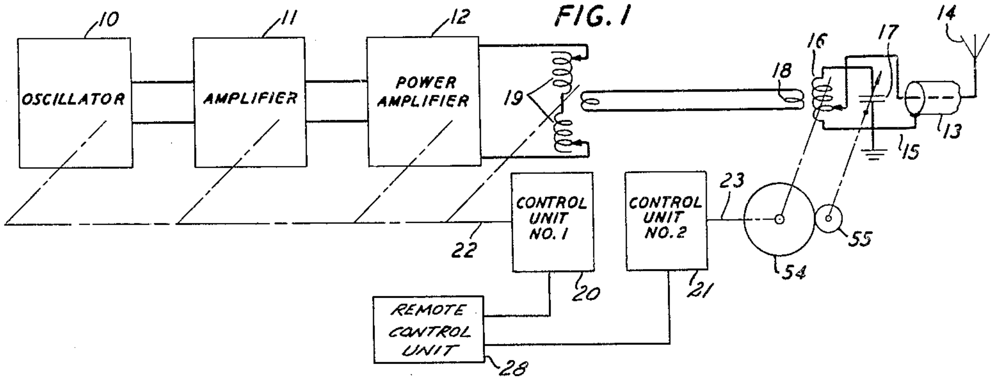
Fig. 1 is a schematic circuit diagram of one embodiment of the invention in a radio transmitter.

Fig. 1 shows in block schematic a radio transmitter comprising an oscillator 10, a first amplifier 11 and a power amplifier 12. The output of the power amplifier is fed over a coaxial line 13 to an antenna 14. A matching circuit 15 is provided to obtain impedance matching between the line 13 and the amplifier 12. The matching circuit 15 comprises a coupling inductor 16 having a variable output tap and shunted by a variable condenser 17. The input to the matching circuit 15 is supplied through a primary coil 18 coupled to the inductor 16 and forming part of a link circuit coupled to the plate inductors 19 of the power amplifier 12.

In order to permit rapid tuning of the transmitter to any of several preset frequencies either locally or from a remote position two control units 20 and 21 are provided. Each operates to position its shaft to any of several predetermined positions and to set the tuning elements connected to the shafts accordingly. They are interconnected to be operated together; for example, by electrical connections to a remote control unit 28. These control units 20 and 21, including their interconnection to the remote control unit 28, may be of the type disclosed in Patent 2,285,414 to A. A. Collins of June 9, 1942, for example.

Unit 20 controls the tuning of the oscillator 10 and amplifiers 11 and 12 which have their tuning units ganged on the shaft 22. The unit 21 controls the adjustment of the matching circuit 15 through the shaft 23. This will be described in detail with particular reference to Fig. 2.

Figure 2:
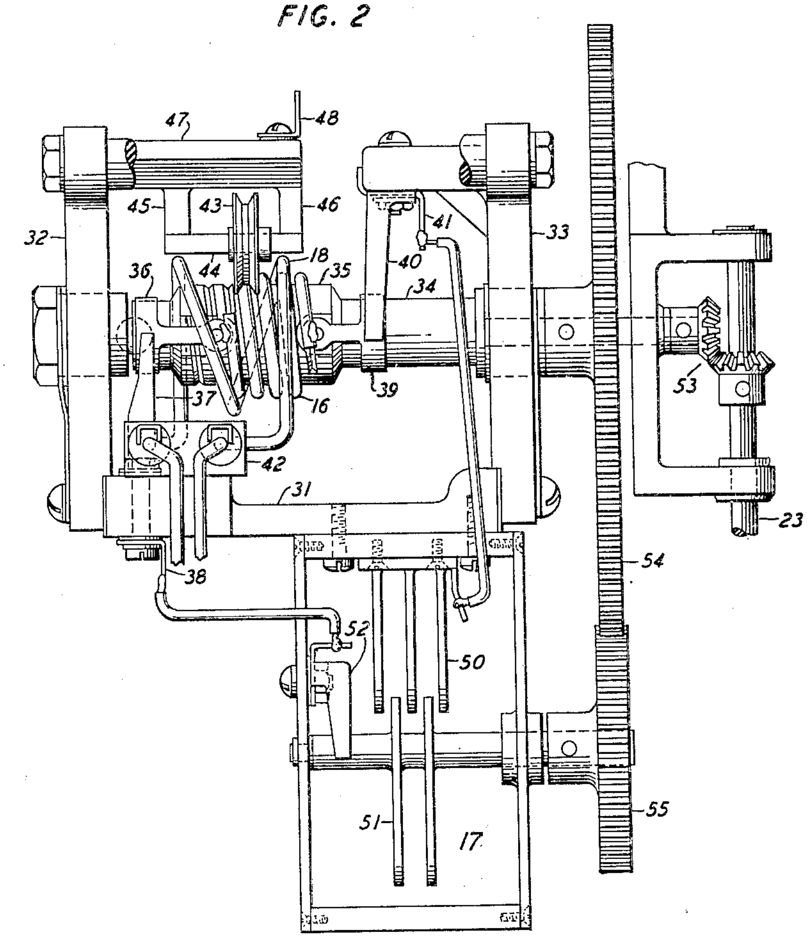
Fig. 2 is a mechanical drawing of the impedance matching system of Fig. 1.

The construction of the matching circuit 15 particularly adapted for use at ultra-high frequencies is shown in Fig. 2. This comprises a main frame including a base 31 and two end plates 32 and 33. A shaft 34 is journaled in the end plates 32 and 33. Carried on or integral with the shaft 34 is a coil form 35. Wound in a threaded groove in the form 35 is the coupling coil 16, the grounded end of which is brought out through a slip ring 36 and resilient wiper 37 to the terminal 38. The other end of the coil 16 is brought out through the slip ring 39 and resilient brush 40 to the terminal 41.

The coupling coil 18 of the link circuit is of the self-supporting type and is mounted with its ends secured in the insulating block 42 mounted on the base member 31. An adjustable tap is brought out from the coil 16 by means of roller-type wiper 43. A shaft 44 supported by the resilient arms 45 and 46 carries the roller 43. The resilient arms 45 and 46 are supported by the member 47 attached to the end plate 32 and serve to keep the roller 43 in good contact with the coil 18. A terminal 48 is provided to connect the inner conductor of the coaxial line 13 to the roller 43.

The variable condenser 17 is mounted on the base plate 31. This condenser is a conventional variable air condenser having a set of stator plates 50 and a set of rotor plates 51 both of semi-circular shape. The condenser is connected in shunt to the coil 16, the stator plates 50 being connected to the high voltage end of the coil at the terminal 41 and the rotor being connected to the grounded end at the terminal 38 through the resilient wiper 52.

The shaft 23 driven by the control unit 21 drives the shaft 34 and consequently the coil 16 through the bevel gears 53. This causes the roller contact 43 to move along the coil 16 thus varying the taping point thereon. At the same time the rotor 51 is driven through the gears 54 and 55, which have such a ratio that the rotor 51 makes two and one-half revolutions for each revolution of the coil 16. The system is designed so that the rotor contact 43 follows the coil for two turns for the complete range of angular adjustment provided by the control unit 23. Accordingly there are a total of ten resonance points provided by the condenser 17 within the same range of the control unit 21 because of the fact that there are two resonance points (i. e., capacity values) for each revolution of the rotor 51—one upon the rotor plates entering the stator plates and the other upon their leaving. As a result, for any resonance value, or more properly for any reactance value as determined by the condenser 17 at any particular position in parallel with the coil 16 there will be any of ten different values of resistance as determined by the possible positions of the rotor contact on the coil 16.

Figure 3:
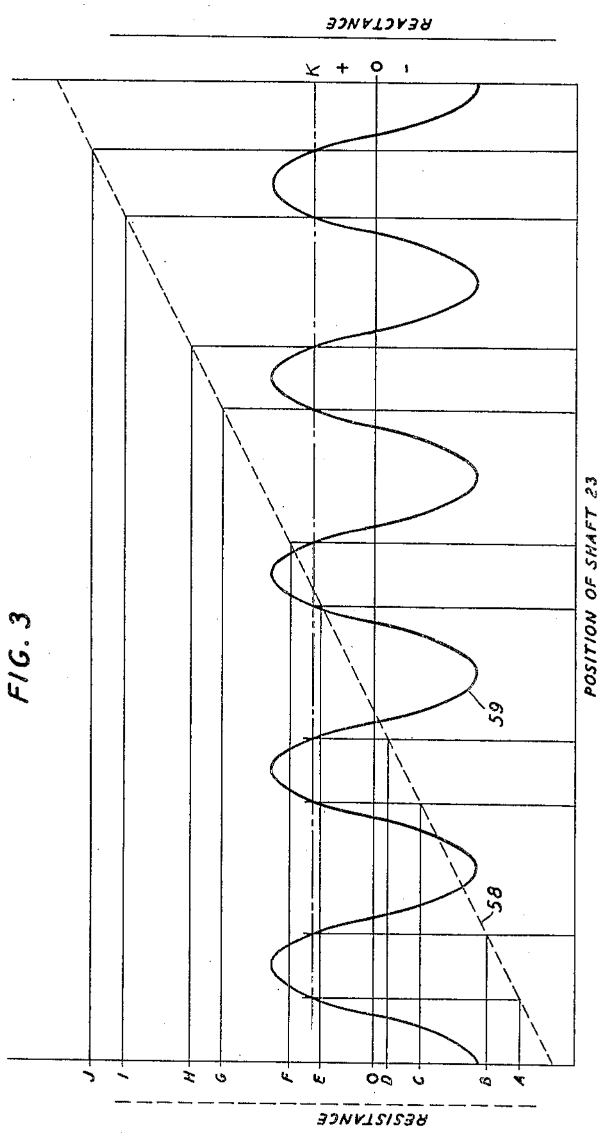
Fig. 3 is an explanatory diagram.

The operation of the impedance matching circuit in this manner can be better understood by reference to the diagrams of Fig. 3, wherein positions of the shaft 23 (as determined by the control unit 21) are plotted as abcissae and values of resistance as determined by the positions of the rotor contact 43 on coil 18 are shown by the dotted curve 58 and along the left-hand vertical scale, while corresponding values of reactance as determined by the positions of the rotor 51 are shown by the full line curve and along the right-hand vertical scale. Thus it may be seen that any value of reactance, for example, +K on the right-hand scale can be obtained at any of ten positions of the shaft 23. On the other hand, for each of these shaft positions there will be a different value of resistance as indicated by the dotted curve 58 and shown by the values A to J on the left-hand scale. Accordingly, the device provides a considerable flexibility in the choice of relative values of reactance and resistance permitting impedance matching with a considerable variety of antennae and lengths of the connecting line 13. The degree of flexibility in any case is determined by the ratio of the drive of the coupling coil and condenser and the particular values herein used are for purposes of illustration only. The precision of adjustment is directly proportional to the drive ratio which may be made any practical value as required for any particular application.

In setting up the control unit 21 for any particular frequency it will be observed that as the unit 21 is moved through its range to turn the shaft 23 there will be a series of ten peak indications on the field strength, antenna current or other meter used as an indicator. That position at which the highest of these peaks occurs is chosen as the position for that frequency.

What is claimed is:

1. In combination, a variable capacitor, an inductor having a variable tap and being connected in parallel with said variable capacitor, an output circuit connected to said variable tap, and a drive for simultaneously operating said variable capacitor and said variable tap at different speeds to vary said capacitor through its range of variations a plurality of times for each single variation of said tap through its range.

2. In a radio transmitter, an oscillator and amplifier system, means for tuning said system to any of a plurality of preset frequencies, a load circuit, an output circuit for coupling said amplifier to said load circuit comprising a variable reactor and a coupling unit having a coefficient of coupling variable over a range, and means for adjusting said output circuit for operation at any of said plurality of preset frequencies comprising means for driving said variable reactor through its range of variations a plurality of times while simultaneously driving said variable coupling through the range of variations of its coefficient of coupling a single time.

3. In an electrical system for coupling an input circuit to load circuits of a range of impedances for the efficient supply thereto of oscillatory electrical energy of a range of frequencies, coupling means having a coupling coefficient variable over a predetermined range, a reactor of reactance value variable over a predetermined range, and a drive for simultaneously varying the reactance value of said reactor and the coefficient of coupling of said coupling means at such relative rates that the reactance value of said reactor varies over its said range a plurality of times for each variation of the coupling coefficient over its said range.

ARTHUR E. HARRISON.

REFERENCES CITED

The following references are of record in the file of this patent:

UNITED STATES PATENTS

| Number | Name | Date |
|---|---|---|
| 1,491,288 | Clarke | Apr. 22, 1924 |
| 1,511,127 | Hermann | Oct. 7, 1924 |
| 1,551,624 | Schelling | Sept. 1, 1925 |
| 1,552,266 | Bradley | Sept. 1, 1925 |
| 1,977,397 | Morel | Oct. 16, 1934 |
| 2,205,190 | Farrington | June 18, 1940 |
| 2,223,080 | Swarbrick | Nov. 26, 1940 |

FOREIGN PATENTS

| Number | Country | Date |
|---|---|---|
| 642,948 | France | Sept. 6, 1928 |